UNITED STATES PATENT OFFICE.

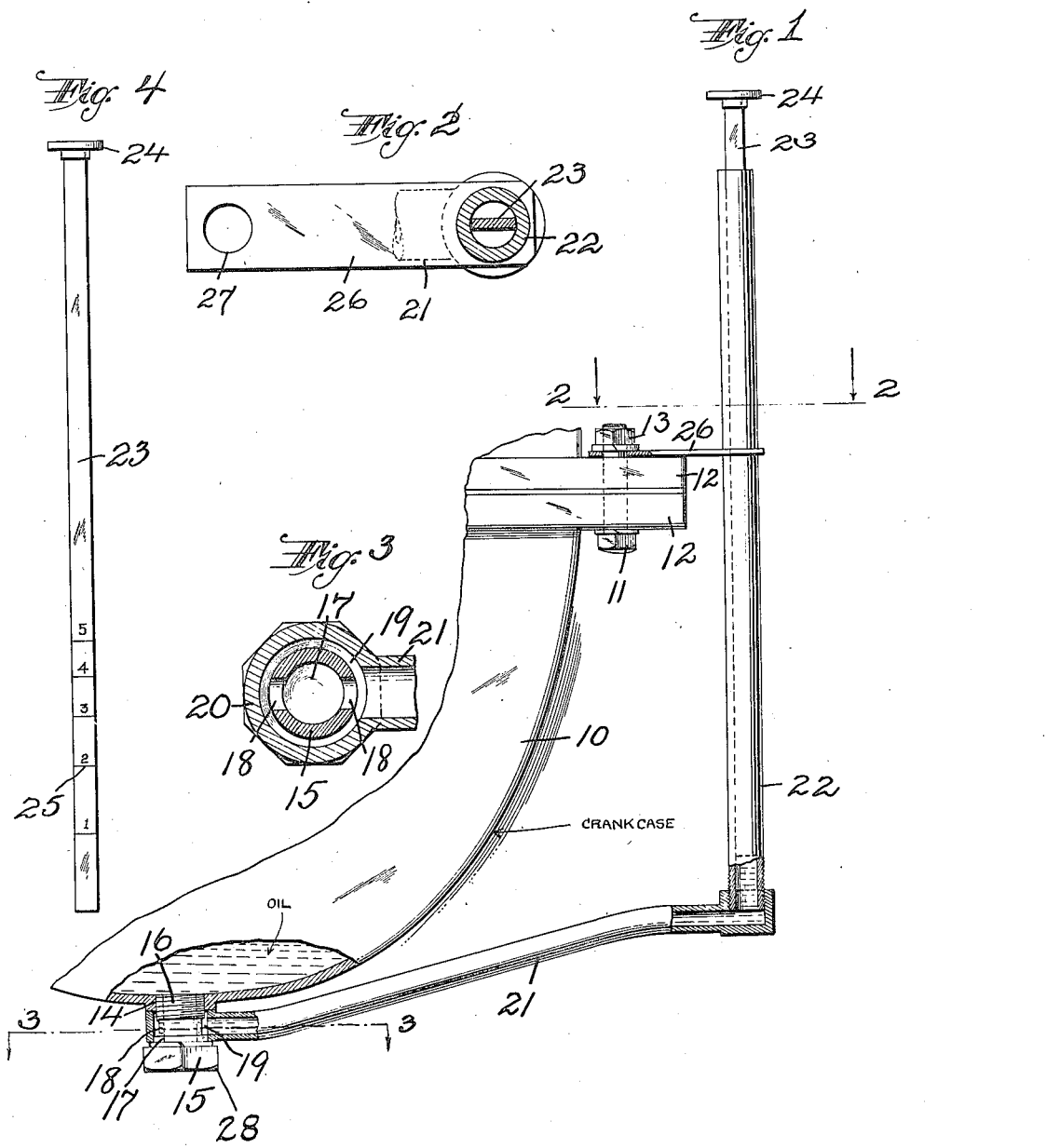

ALEXANDER BRUNNER, OF NEWARK, NEW JERSEY.

OIL GAUGE FOR INTERNAL-COMBUSTION ENGINES.

1,419,012.  Specification of Letters Patent.  Patented June 6, 1922.

Application filed November 30, 1920. Serial No. 427,277.

*To all whom it may concern:*

Be it known that I, ALEXANDER BRUNNER, a citizen of the United States, and a resident of Newark, county of Essex, and State of New Jersey, have invented certain new and useful Improvements in Oil Gauges for Internal-Combustion Engines, of which the following is a specification.

This invention relates to an oil gauge to be installed on the crank case of an internal combustion engine, and which is attachable without any waste of time and without the service of a mechanic, the device being secured in position at the bottom by utilizing the plugged opening in the bottom of the crank case of engines of the kind used in automobiles. The device can be still more firmly fixed, if desired, by its attachment to the flange of the crank case by means of one of the bolts that hold the sections of the crank case together.

The invention also resides in certain details of construction which will be more fully described hereinafter and finally embodied in the claims.

The invention is illustrated in the accompanying drawing, in which Figure 1 is a view partly in section showing part of a crank case with the oil gauge in place. Figure 2 is an enlarged section taken on line 2—2 in Figure 1. Figure 3 is a detail section looking downward taken on a plane indicated by line 3—3 in Figure 1, and Figure 4 is a view of a measuring stem or ullage rod usable in the device.

In the drawing 10 indicates the crank case of the engine, the crank case having the usual detachable bottom portion held to the top part by bolts 11 passing through the flanges 12 and held by a suitable nut 13. The usual crank case is also provided with a perforation 14 at the bottom which is closed by a screw plug or screw cap.

In my improved gauge I utilize this bottom opening and provide a plug 15 having a head 28 and having a screw-threaded part 16 to screw into the hole 14, the plug having a bore 17 with its inner end open and having a lateral opening or openings 18 which are located in an annular groove between the head and the screw-threaded part. The annular space 19 is formed between the plug and the eye 20 placed at the end of the pipe 21, the eye being held in position and supported between the bottom of the crank case and the head of the plug 15 when the plug is screwed into position. The pipe 21 extends transversely and is provided at its free end with a suitable visible gauge for permitting observation of the height of the level of oil in the crank case.

In the form shown this gauge comprises a vertical pipe 22 which is attached to the end of the pipe 21 and has an open top end into which the measuring stem or ullage rod 23 slides, this preferably having a finger-piece 24 at the top which also forms a cap for normally closing the top end of the pipe 22, the stem 23 having suitable markings, as 25, the preferred form being markings that indicate the number of quarts of oil that are in the crank case, although the units designated on the scale are immaterial.

To form a stable support I provide a lateral strip 26 on the pipe 22, this strip 26 having a hole 27 near the end of it, which hole is placed over one of the bolts 11 of the crank case after the nut 13 has been removed, and when the nut 13 is screwed down the vertical part of the gauge is securely supported.

It will be evident that this device can be quickly attached, it being only necessary to remove the plug that is usually placed in the opening 14 in the bottom of crank cases, attaching the pipe 21 by means of the plug 15, putting the strip 26 in position over a bolt 11 and screwing down the nut 13.

I claim:

1. An oil gauge attachment comprising a plug with an open inner end and a transverse lateral passage, a pipe having one end in the form of an eye held by the plug against a crank case and spaced from the plug to form an annular passage communicating with the passage in the pipe, said pipe including a vertical part with a lateral perforated lip to go over a bolt on the crank case, and an ullage rod in said vertical part.

2. An oil gauge attachment comprising a plug with a screw-threaded part on the inner end, a head on the outer end forming an annular groove between them, the plug having an open inner end, a pipe having an end in the form of an eye to be clamped between the head of the plug and a crank case when the plug is screwed into the crank case, and to surround the groove to form a chamber communicating with the passage in the pipe, a vertical pipe in extension of the first mentioned pipe, and an ullage rod in the vertical pipe.

In testimony that I claim the foregoing, I have hereto set my hand, this 29th day of November, 1920.

ALEXANDER BRUNNER.